(12) United States Patent
Papadopoulos et al.

(10) Patent No.: US 12,455,447 B2
(45) Date of Patent: Oct. 28, 2025

(54) EYE TRACKING

(71) Applicant: ams International AG, Jona (CH)

(72) Inventors: Ioannis Papadopoulos, Eindhoven (NL); Daniel Najer, Eindhoven (NL); Volker Zagolla, Eindhoven (NL); Ferran Suarez, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 0 days.

(21) Appl. No.: 18/562,509

(22) PCT Filed: May 13, 2022

(86) PCT No.: PCT/EP2022/063018
§ 371 (c)(1),
(2) Date: Nov. 20, 2023

(87) PCT Pub. No.: WO2022/243185
PCT Pub. Date: Nov. 24, 2022

(65) Prior Publication Data
US 2024/0255753 A1 Aug. 1, 2024

(30) Foreign Application Priority Data
May 20, 2021 (GB) ................... 2107231

(51) Int. Cl.
*G02B 27/00* (2006.01)
*G01S 7/481* (2006.01)
(Continued)

(52) U.S. Cl.
CPC ........ *G02B 27/0093* (2013.01); *G01S 7/4811* (2013.01); *G01S 17/58* (2013.01);
(Continued)

(58) Field of Classification Search
CPC ............ G02B 27/0093; G02B 27/0172; G02B 27/0955; G02B 27/0977; G01S 7/4811; G01S 17/58; G06F 3/013
See application file for complete search history.

(56) References Cited

U.S. PATENT DOCUMENTS

| 6,424,407 B1* | 7/2002 | Kinrot ................... G01S 7/4811 356/28 |
| 11,435,820 B1* | 9/2022 | Hirsh .................... G06F 3/0346 |

(Continued)

FOREIGN PATENT DOCUMENTS

| JP | 2017526078 A | 9/2017 |
| JP | 2018523106 A | 8/2018 |

(Continued)

OTHER PUBLICATIONS

International Search Report issued Sep. 8, 2022, for corresponding International Patent Application No. PCT/EP2022/063018 (3 pages).

(Continued)

*Primary Examiner* — William Lu
(74) *Attorney, Agent, or Firm* — Viering, Jentschura & Partner mbB (57) ABSTRACT

An eye tracking device for integrating in a frame for mounting to a user's head includes a laser output unit for fixing to the frame. The laser output unit is configured to provide a laser beam for illuminating a cornea of the user's eye when in use. The eye tracking device also includes a receiver unit for fixing to the frame. The receiver unit is configured to receive a reflection of the laser beam and to provide a tracking signal usable for determining a distance or velocity of the cornea. The eye tracking device further includes a processing unit for determining a rotation of the user's eye from the tracking signal.

16 Claims, 12 Drawing Sheets

(51) Int. Cl.
  *G01S 17/58* (2006.01)
  *G02B 27/01* (2006.01)
  *G02B 27/09* (2006.01)
  *G06F 3/01* (2006.01)
(52) U.S. Cl.
  CPC ..... *G02B 27/0172* (2013.01); *G02B 27/0955* (2013.01); *G02B 27/0977* (2013.01); *G06F 3/013* (2013.01)

(56) References Cited

U.S. PATENT DOCUMENTS

| | | | |
|---|---|---|---|
| 2006/0269190 A1* | 11/2006 | Kim | H01S 5/141 385/14 |
| 2014/0184475 A1* | 7/2014 | Tantos | H04N 21/2343 18 345/8 |
| 2015/0324568 A1 | 11/2015 | Publicover et al. | |
| 2015/0378431 A1* | 12/2015 | Donaldson | G06F 3/04842 382/103 |
| 2017/0131765 A1* | 5/2017 | Perek | G06F 3/0304 |
| 2017/0214907 A1* | 7/2017 | Lapstun | H04N 13/229 |
| 2018/0033405 A1* | 2/2018 | Tall | G06T 9/00 |
| 2018/0143320 A1* | 5/2018 | Steever | G01S 17/89 |
| 2018/0196263 A1* | 7/2018 | Vallius | G02B 27/0172 |
| 2018/0209892 A1 | 7/2018 | Van Der Lee et al. | |
| 2018/0210547 A1* | 7/2018 | Sarkar | G02B 27/0172 |
| 2018/0314325 A1* | 11/2018 | Gibson | G06V 40/19 |
| 2019/0287495 A1* | 9/2019 | Mathur | G02B 27/0172 |
| 2019/0376782 A1* | 12/2019 | Marra | G01S 7/4815 |
| 2020/0174564 A1 | 6/2020 | Sangu et al. | |
| 2021/0080637 A1* | 3/2021 | Brick | G02B 27/0172 |
| 2021/0243384 A1* | 8/2021 | Ollila | G06V 20/20 |
| 2021/0271320 A1* | 9/2021 | Fiess | G02B 27/0093 |
| 2021/0294106 A1* | 9/2021 | Meitav | H04N 9/31 |
| 2021/0373325 A1* | 12/2021 | Petersen | G02B 27/1006 |
| 2021/0373659 A1* | 12/2021 | Petersen | G06F 3/017 |
| 2021/0408761 A1* | 12/2021 | Scheller | H01S 5/1833 |
| 2022/0221722 A1* | 7/2022 | Yoshida | G01C 3/02 |
| 2023/0053107 A1* | 2/2023 | Diaz | G02B 27/0093 |
| 2024/0013752 A1* | 1/2024 | Hua | G09G 5/391 |

FOREIGN PATENT DOCUMENTS

| | | | | |
|---|---|---|---|---|
| JP | 2020087200 A | 6/2020 | | |
| KR | 10-2021-0049868 A | 5/2021 | | |
| WO | WO-2023019014 A1 * | 2/2023 | | G06F 3/013 |

OTHER PUBLICATIONS

Written Opinion issued Sep. 8, 2022, for corresponding International Patent Application No. PCT/EP2022/063018 (7 pages).

Taimre et al., "Laser feedback interferometry: a tutorial on the self-mixing effect for coherent sensing," Advances in Optics and Photonics, Aug. 20, 2015, vol. 7, no. 3, pp. 570-631; Cited in NPL Nos. 1 and 2.

Notice of Reasons for Rejection issued in corresponding patent application JP2023-571964, mailed Dec. 24, 2024, 8 pages incl. English translation (for reference purpose only).

Search Report by Registered Search Organization issued for corresponding Japanese Patent Application No. 2023/571964, Dec. 11, 2024, 42 pages (for reference purpose only).

Hiroi, Yuichi et al., "Visual Appearance Reproduction by Optical See-Through Head-Mounted Display based on Light Measurement and Modulation", The 25th Annual Conference of the Japanese Society of Virtual Reality [online], Sep. 16, 2020, 10 pages (including 6 pages of English machine translation).

* cited by examiner

EYE TRACKING

CROSS REFERENCE TO RELATED APPLICATION

This application is a National Stage of International Application No. PCT/EP2022/063018, filed on May 13, 2022, which designates the United States and was published in English, and which claims priority to Great Britain Patent Application No. 2107231.9, filed on May 20, 2021, in the Intellectual Property Office. All of the aforementioned applications are hereby incorporated by reference in their entireties.

FIELD OF DISCLOSURE

The present disclosure relates to eye tracking devices, in particular devices for integrating in a frame for mounting to a user's head, for example in AR smart glasses.

BACKGROUND

Eye tracking is an important user side sensing modality that can enable a diverse set of applications in e.g. Augmented Reality (AR) applications.

State of the art eye tracking sensing modalities rely on imaging of the eye and cornea using an imaging sensor and the identification of the gaze vector based on data processing of the acquired image. Such approaches tend to be of high power consumption, low accuracy, and/or slow data collection. Equally important is that the placement of the imaging sensor is chosen in a way to maximize the quality of the acquired data, leading to placements that are obstructing the field of view in the bearing device.

An ideal eye tracking solution should have low power consumption, be accurate, fast, and have a small form factor with a simple integration in the bearing device. Current systems cannot provide all of these features together.

SUMMARY

To solve at least some of these problems there is provided a device that uses laser light to measure the distance of specific points on the cornea and uses this information to infer the rotational position of the eye.

According to a first aspect of the present disclosure there is provided an eye tracking device for integrating in a frame for mounting to a user's head (e.g. smart glasses, AR headset, VR headset, helmet or similar) comprising a laser output unit for fixing to the frame and configured to provide a laser beam for illuminating a cornea of the user's eye when in use. The device further comprises a receiver unit (which may be the same as the laser output unit when using SMI) for fixing to the frame and configured to receive a reflection of the laser beam and to provide, a tracking signal usable for determining a distance or velocity of the cornea, and a processing unit for determining a rotation of the user's eye from the tracking signal. Hence, the eye-tracking device does not require imaging of the eye.

Preferably the eye-tracking device provides at least two spatially separated laser beams for illuminating different points on the cornea of the user's eye, wherein the receiver unit is configured to receive reflections from both laser beams and, for each of the received reflections, provide a tracking signal usable for determining the distance or velocity of the respective points of the cornea. Using two or more laser beams can improve the accuracy of the eye-tracking.

More preferably, at least three spatially separated laser beams are provided by the laser output unit. Again, the device is configured so that each laser beam illuminates a different point on the cornea of the user's eye. The receiving unit is configured to receive the reflections from the at least three laser beams and to provide corresponding tracking signals. The tracking signals can then be used to determine the rotation of the user's eye (e.g. from the change in distance or from the velocity of the different points of the cornea). By using at least three laser beams (from three laser sources) the accuracy can be further improved.

When having multiple laser beams, the beams can be distributed symmetrically on the cornea of the user's eye. For example, three laser beams may illuminate three points on the cornea of forming an equilateral triangle. For applications where tracking the rotation of the eye in some directions is more important than in other directions (for example where accurate horizontal tracking is more important than vertical tracking) other distributions of the laser beam illumination on the cornea may be appropriate. For example, a non-symmetrical distribution may be used for some applications.

A laser source is used by itself or together with an optical element to produce an illumination field over the eye and in particular the cornea. Depending on the actual geometry, a specific position on the cornea surface will produce a reflection of this illumination field that can be detected. As the cornea is a spherical surface offset from the rotation point of the eye, any rotation of the eye will lead to a displacement of the cornea. This links the cornea target point displacement measured with the laser signal to the rotation of the eye. Because the proposed method infers the eye rotation from the relative distance change of a specific point on the cornea, any eye rotation within a given cone around the starting position leads to the same distance change and therefore an uncertainty between measurement and rotation. To overcome this, further and preferably at least three laser beams with different positions may be used.

The laser output unit typically comprises a laser source (one for each laser beam), such as laser diodes, e.g. edge emitting lasers, distributed feedback (DFB) lasers, distributed bragg reflector (DBR) lasers, or vertical cavity surface emitting lasers (VCSELs). Alternatively, the laser output unit may comprise an optic waveguide connected to a laser source. The waveguide would typically be a single wave mode fibre optic waveguide. The laser output unit may comprise multiple waveguides connected to respective laser sources for providing multiple (typically three) laser beams. Hence, the actual laser sources may be located off the integrating device (i.e. off the frame) but connected to the device via the waveguides. The laser source should be very monochromatic (narrowband) and have high coherence for accurate distance/displacement measurements. VCSELs have the advantage of being relatively cheap and have low power consumption. The laser sources may be configured to operate at a wavelength in the infrared or near infrared spectra. For example, the laser sources may be configured to emit light having a wavelength in the range of 850 nm to 1500 nm, e.g. at 940 nm. Longer wavelengths are typically better in terms of eye safety, and can therefore be used with a relatively higher output power, which may provide a better signal.

Advantageously, the laser output unit is also the receiver unit and the tracking signal(s) are provided by measuring the phase difference between the emitted and the received laser beam. In particular, self-mixing interferometry, SMI, where self-mixing interference occurs in the laser sources may be used to provide an SMI signal as the tracking signal. SMI allows for accurate distance/displacement measurements without requiring additional photodiodes for receiving the reflected light. Using SMI, a portion of the illumination light is reflected off the cornea surface and makes its way back to each respective laser source. The reflected light coupled back into the laser cavity interferes with the original laser light leading to a modulation of the laser emission characteristics.

Measuring the changes in the laser emission characteristics (e.g. laser power output, junction voltage etc.) can provide information about the relative position change of the remote target (specific points on the cornea surface).

SMI may use optical detection, wherein each tracking signal is determined from an optical output of the respective laser source. For example, a photodiode may be placed close to the laser source and measure the output intensity of the laser source. The photodiode may be integrated in the laser epitaxy or may be located behind the laser source and arranged to monitor the power output on the laser mirror opposite to the eye emission. Alternatively, each tracking signal may be determined from a current or voltage input to the respective laser source. As the SMI affects the laser output it also affects the power supply to the laser source, which can be measured to determine the distance/displacement.

The spatially separated laser beams may be separated by an angular distance in the range of 3.5° to 20° on the cornea of the user's eye when in use. For example, in a configuration using three laser sources, the laser beams may be separate by a minimum angular distance of about 17°. Other values of the angular distance of laser sources are also possible and may depend on the number of laser beams used. The spatially separated laser beams may contain a number of laser beams in the range of 3 to 12. Whilst three laser beams (from three laser sources) can provide accurate eye tracking, more beams may be used to improve eye tracking or to provide redundancy in the system (e.g. should one laser source fail). However, a greater number of sources may increase the complexity and power consumption of the device.

The device may further comprises one or more optical elements fixed to the frame and configured to modulate the laser beams illuminating the cornea. For example, the one or more optical elements may be collimating lenses for providing plane wave illumination of the cornea. Alternatively, the one or more optical elements may be focusing lenses for focusing the laser beams on the cornea. The optical elements may be reflective lenses. The laser output unit can then be fixed to the stem of the frame running a long a side of the user's head. Alternatively, the one or more optical elements may be transmission lenses. The laser output unit may for example be placed in front of the user's eye.

The laser can be used with the optical element(s) to create any range of illumination fields onto the cornea surface, from a plane wave illumination to a single focus spot on the cornea surface. For example, this can be achieved by changing the distance between the lens and the laser source. The spherical surface of the cornea will reflect some part of the light back, which interacting with the same or a different optical element will be redirected towards the receiving unit (back to the laser when using SMI). Based on the tracking signal, the depth changes of the remote target can be inferred and linked to the rotation of the eye. The optical element(s) may comprise any of volume-phase holographic (VPH), liquid crystal polarization grating (LCPG), and hot mirror etc.

According to a second aspect of the invention there is provided a method of eye tracking, which may be implemented with the eye-tracking device according to the first aspect. The method comprises mounting a frame to a user's head (e.g. putting the glasses on, illuminating a cornea of the user's eye with a laser beam provided by a laser output unit fixed to the frame, and receiving a reflection of the laser beam with a receiver unit fixed to the frame and providing a tracking signal (e.g. an SMI signal) usable for determining a distance to the cornea or a velocity of the cornea. The method further comprises determining with a processing unit a rotation of the user's eye from the tracking signals. Hence, the method of eye-tracking does not require imaging of the eye.

Preferably at least three spatially separated laser beams are used to provide at least three tracking signals, which can be used together to determine the rotation of the user's eye.

The disclosure provides an eye-tracking solution that uses a small number of illumination and detection elements leading to a low complexity solution. By using optical elements on the frame, the sensing module can be flexibly placed on different positions of the device (e.g. on the stem) allowing for unobtrusive eye-tracking.

Reduced data collection (due to signal read-out from a limited numbers of photodiodes) can lead to increased data rates.

BRIEF DESCRIPTION OF THE PREFERRED EMBODIMENTS

Specific embodiments of the disclosure are described below with reference to the accompanying drawings, wherein.

DETAILED DESCRIPTION

Figure 1:
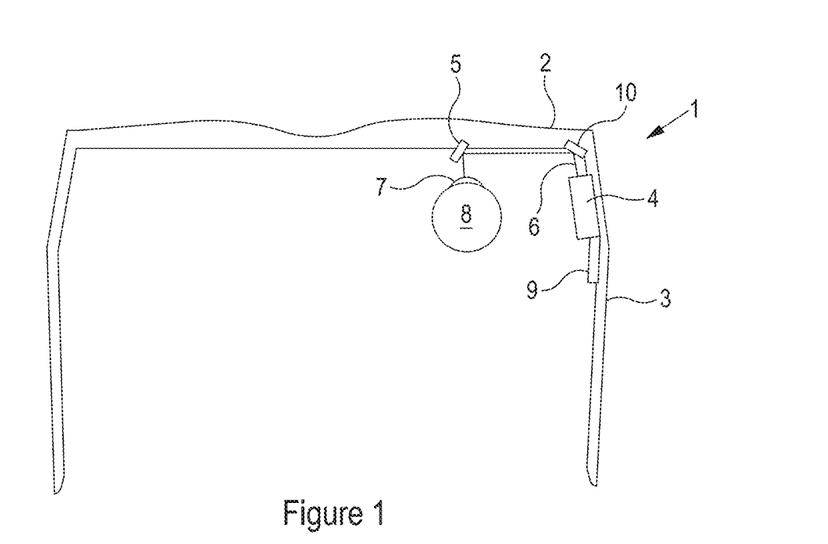
FIG. 1 depicts smart glasses comprising an eye-tracking device according to an embodiment of the disclosure.

FIG. 1 shows an eye tracking device 1 integrated in a pair of glasses (e.g. AR smart glasses) comprising a frame 2 having a stem 3. The device 1 comprises a laser output unit 4 comprising three laser sources being VCSEL lasers, and an optical element 5 for modulating laser beams 6 from the laser output unit 4. The optical element 5 is a reflecting and collimating lens (e.g. a Bragg reflector), which provides a plane wave illumination field on the cornea 7 of the eye 8 of the user/wearer of the glasses. A part of the laser beam 6 is reflected back from the cornea 7 and into the laser output unit 4. Hence, the laser output unit 4 is also a receiver unit for receiving the reflected light. The reflected light interferes with the laser field in the laser source through so called self-mixing interference, which changes the output of the laser. By monitoring the output intensity of the laser or the input voltage or input current to the laser source, the distance to the cornea 7 and/or the velocity of the cornea 7 can be determined. The device 1 comprises a processing unit 9 for determining the distance to the cornea 7 based on self-mixing interferometry (SMI). As the user's eye 8 moves the distance to the reflection point on the cornea 7 shifts, which causes the distance between the laser source and the cornea 7 to change. Hence, the eye movement can be detected. To accurately determine the rotation of the eye in all directions, at least three angularly separated laser beams 6 are used. More beams may be used for more precise eye tracking and/or to provide redundancy in the system. However, an advantage of using only three laser beams 6 is the possible low power consumption and small form factor. The device 1 also comprises a second optical element 10 being a mirror for redirecting the laser beams 6 from the laser output unit 4. Further optical elements can provide greater flexibility in the placement of the laser output unit 4.

In other embodiments, the laser output unit 4 may be placed in the frame in front of the eye 8 and transmit the laser beams 6 directly onto the cornea 7, without requiring a reflective element. Also, it is not necessary to have the laser sources in the laser output unit 4. Instead the laser sources may be placed off the device and be connected to waveguides for transmitting the laser beams 6.

The embodiment provides an eye-tracking device 1 with a small number of illumination and detection devices to measure the relative depth change of specific points on the cornea 7 and use this information to infer the gaze direction of the eye 8. The SMI signal used to detect the depth change of each point can be measured, with an integrated photodiode in the laser source, or via direct measurement of the gate voltage. The use of laser illumination and detection enables the combination of the sensing module with highly transparent and efficient reflective optical components placed in the eyepiece. It is exactly this that allows the flexible placement of the sensing module within the stem 3 of head wearable devices. The combination of SMI detection (capable of measuring very small depth changes of the point of interest) together with the placement of the various illumination and detection sources in a particular geometry enables very high accuracy over the full eye rotation space. Finally, the solution comprising of a minimum of three sources (each one being potentially a lower power consuming VCSEL) leads to an overall low power consumption.

Figure 2:
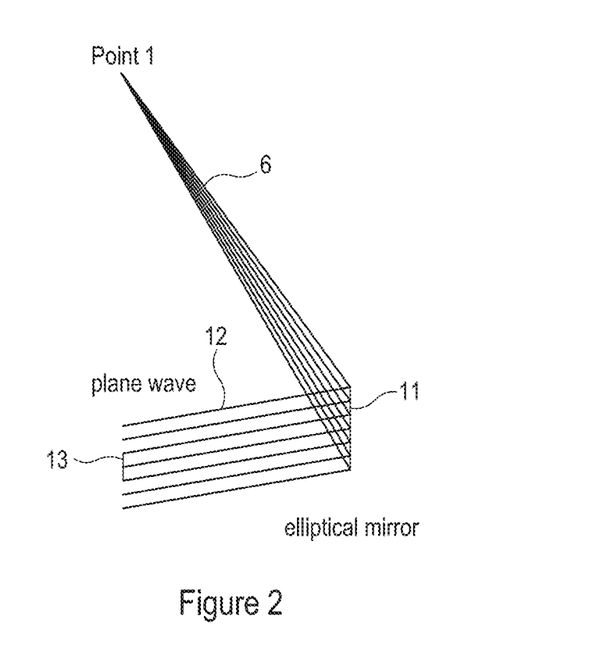
FIG. 2 depicts a part of an eye tracking device according to an embodiment.

FIG. 2 shows a schematic diagram of a diverging laser beam 6 reflected from a holographic elliptical mirror 11 to provide a plane wave illumination field 12 on a target 13 (e.g. the cornea of a user's eye). The holographic elliptical mirror 11 may be used as an optical element in the eye-tracking device 1 of FIG. 1 to provide plane wave illumination. The same reference numerals have been used to refer to equivalent or similar features in different figures for clarity, and are not intended to limit the illustrated embodiments.

Figure 3:
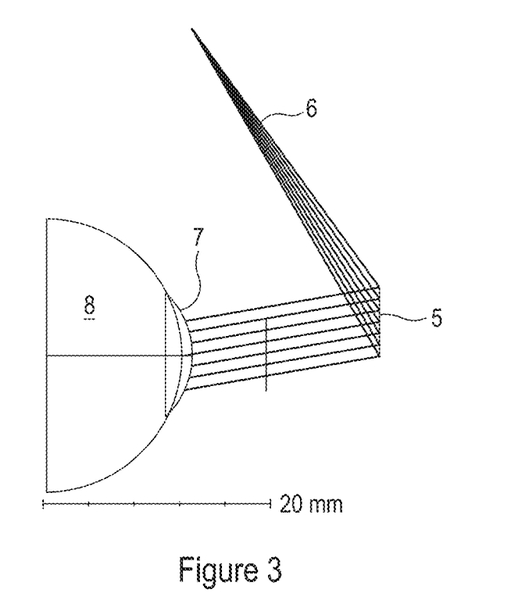
FIG. 3 depicts a part of an eye tracking device according to an embodiment when in use.

FIG. 3 shows a laser beam 6 with an optical element 5 being a reflective lens for illuminating the cornea 7 of an eye 8. The optical element may be a holographic elliptical mirror (HOE) as illustrated in FIG. 2 to provide a plane wave.

Figure 4:
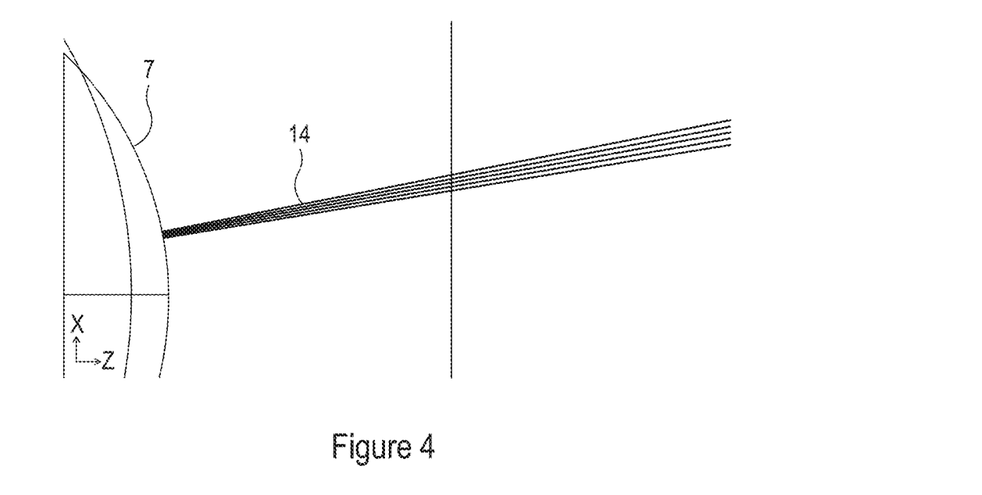
FIG. 4 depicts a laser beam reflected from the cornea of the eye.

FIG. 4 shows a reflected laser beam 14. The laser beam 14 is reflected from the cornea 7. Due to the curvature of the cornea, the reflected laser beam 14 is diverging. The reflected laser beam 14 may be a reflection of the laser beam 6 illustrated in FIG. 3.

Figure 5A:
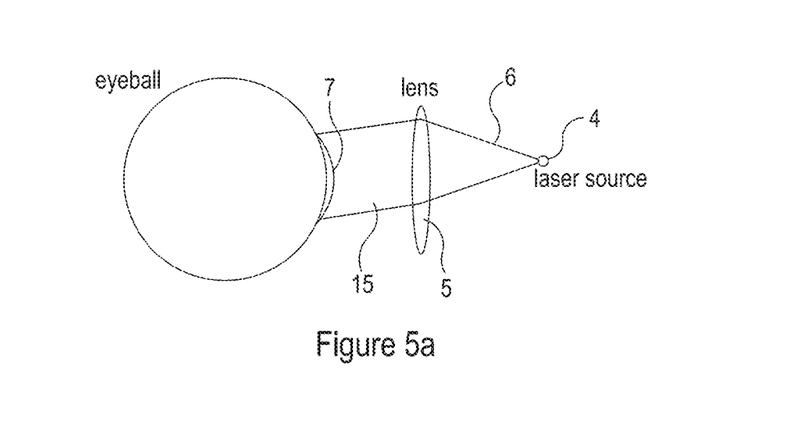
FIG. 5a depicts a part of an eye tracking device comprising a collimating transmission lens.
Figure 5B:
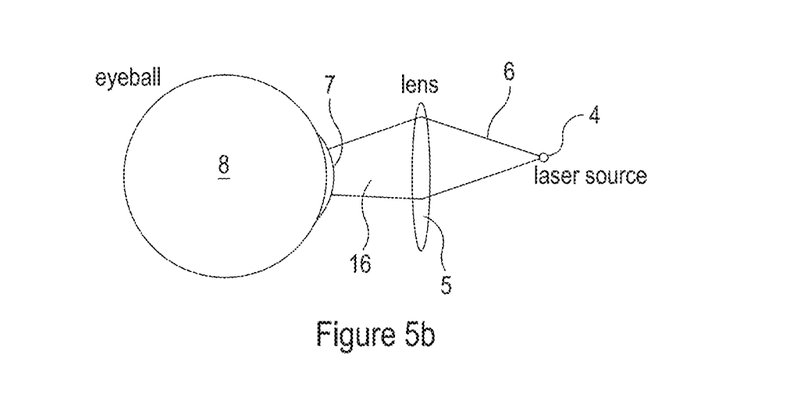
FIG. 5b depicts a part of an eye tracking device comprising a weakly focusing transmission lens.
Figure 5C:
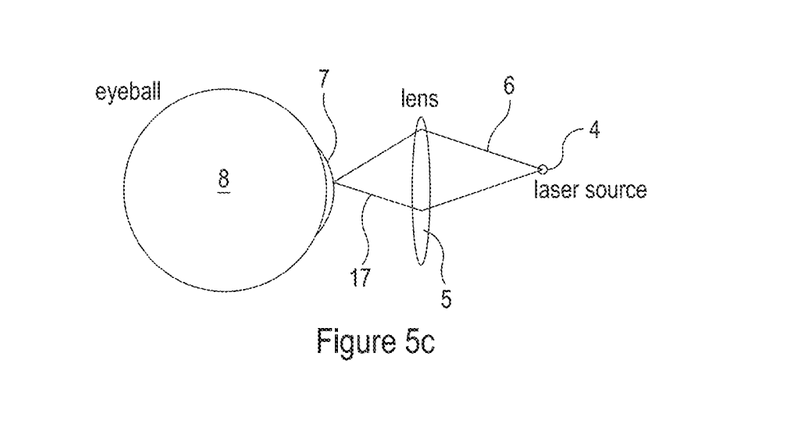
FIG. 5c depicts a part of an eye tracking device comprising a strongly focusing transmission lens.

FIGS. 5a to 5c show a part of an eye-tracking device according to embodiments having a laser output unit 4 and an optical element 5 being a transmission lens (as opposed to a reflective lens). The optical element provides a illumination field on the cornea 7 of the eye 8. FIG. 5a shows an embodiment with a collimating lens, which provides plane wave illumination 15. FIG. 5b shows an embodiment with a weakly focusing lens, with a focus behind the surface of the cornea 7, providing a weakly focused illumination 16. FIG. 5c shows an embodiment with a strongly focusing lens, with a focus substantially on the surface of the cornea 7, to provide strongly focused illumination 17.

Figure 6A:
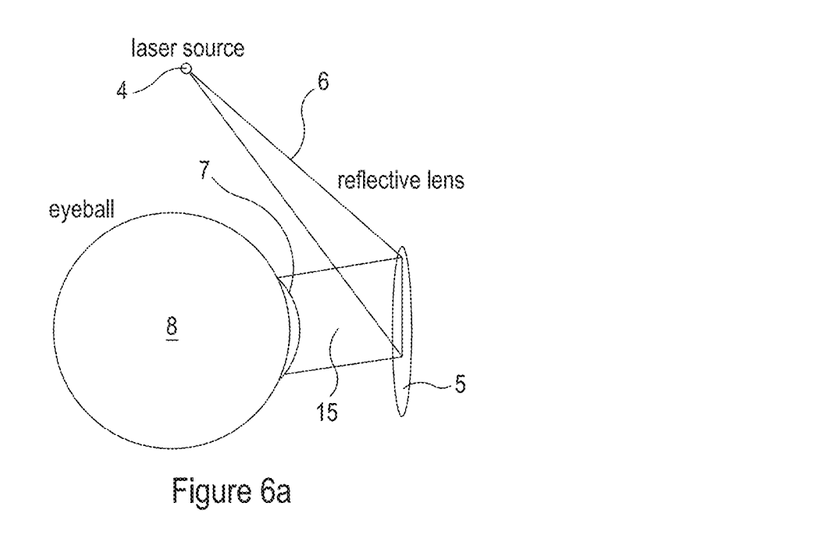
FIG. 6a depicts a part of an eye tracking device comprising a collimating reflective lens.
Figure 6B:
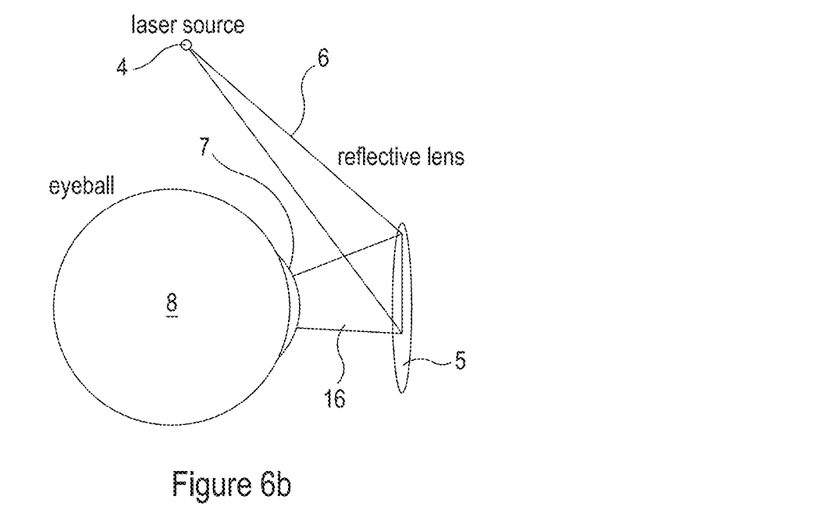
FIG. 6b depicts a part of an eye tracking device comprising a weakly focusing reflective lens.
Figure 6C:
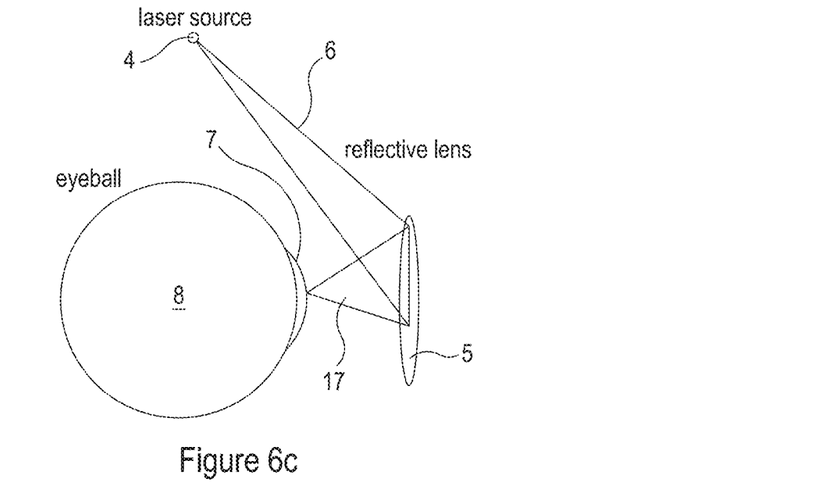
FIG. 6c depicts a part of an eye tracking device comprising a strongly focusing reflective lens.

FIGS. 6a to 6c show a part of an eye-tracking device according to embodiments having a laser output unit 4 and an optical element 5 being a reflective lens. The laser output unit 4 provides a laser beam 6 which is modulated by the optical element to provide an illumination field on the cornea 7 of the eye 8. FIG. 6a shows an embodiment with a collimating lens, which provides plane wave illumination 15. FIG. 6b shows an embodiment with a weakly focusing lens, with a focus behind the surface of the cornea 7, providing a weakly focused illumination 16. FIG. 6c shows an embodiment with a strongly focusing lens, with a focus substantially on the surface of the cornea 7, to provide strongly focused illumination 17.

Figure 7:
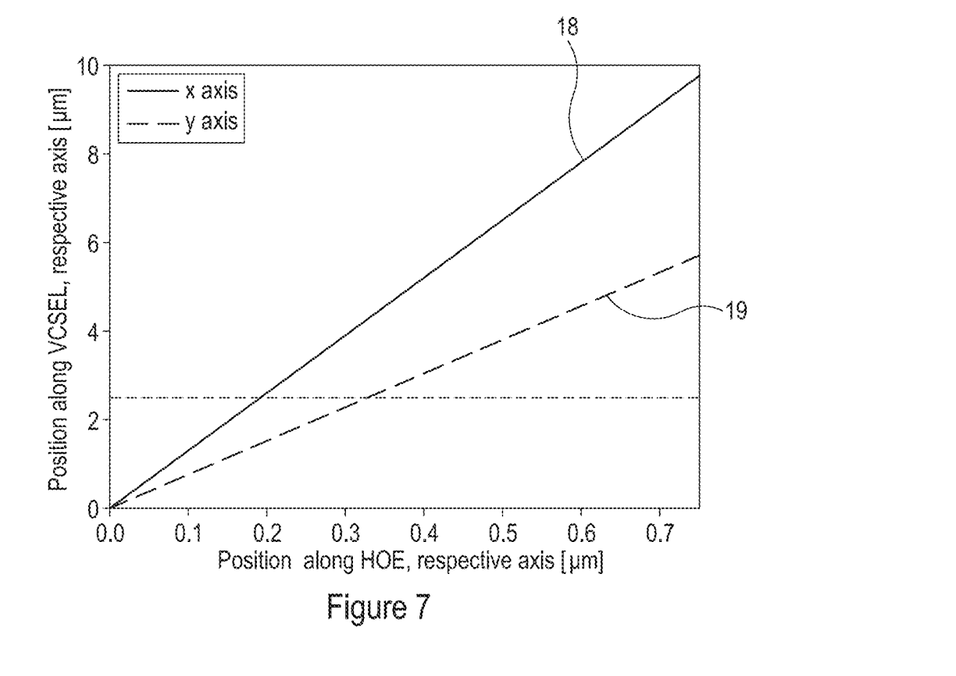
FIG. 7 depicts a graph plotting the position of a reflected laser beam on a VCSEL laser source against the position on a reflective lens.

FIG. 7 shows a graph plotting the position of reflected laser light on the VCSEL laser source against the position of reflected laser light on the optical element being a holographic optical mirror (HOE). Two lines 18 and 19 are plotted for positions along the x-axis 18 and the y-axis 19 respectively.

Figure 8:
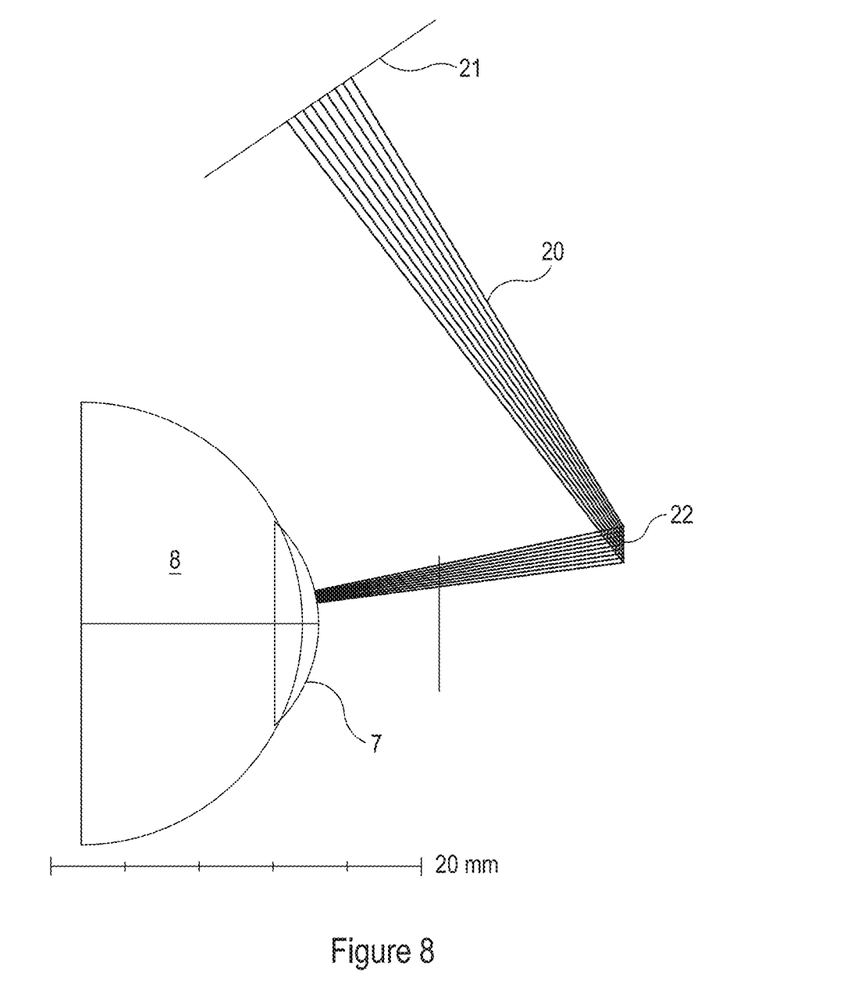
FIG. 8 depicts a part of an eye-tracking device comprising a holographic optical element (HOE) mirror.

FIG. 8 illustrates the diverging laser beam 20 reflected from the cornea 7 of the eye 8 and incident on the VCSEL laser source 21 via the HOE 22. Because of the curvature of the cornea 7, the reflected light is diverging and ends up illuminating a relatively large area on the VCSEL plane (see FIG. 7). In order to estimate the power ratio, the size of the HOE aperture that will be captured into the VCSEL aperture must be identified. The power ratio is given by the diffracting aperture divided by the full illumination aperture, wherein the full illumination aperture is defined by the eye rotation range and interpupillary distance (IPD) range that is covered. The power ratio is given by:

Power ratio=Fresnel coefficient*Diffracting aperture/ Full illumination aperture Using this equation, simulations can be used to determine a frequency for which the SMI signal will be above the noise floor. The frequency of the signal is the inverse of the measurement time (the time "looking" at the signal) for determining the distance/velocity. The noise is proportional to the bandwidth or to the square root of the bandwidth. Hence, the faster the measurement, the bigger the bandwidth and also the noise.

By changing the optical geometry to a focus spot behind the cornea can increase the power ratio. For example, the power ratio may be increased by a factor of 4 to 8. However, using focusing optics can increase complexity and potentially affect the fitting requirements (e.g. inter-pupillary distance, eye relief, nose height, ear position etc.).

Figure 9:
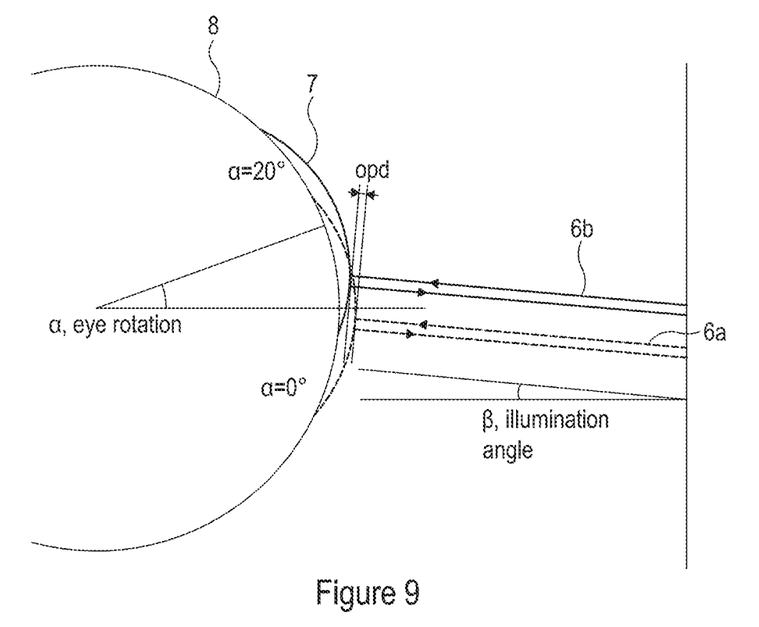
FIG. 9 depicts the optical path difference (OPD) due to a 20° rotation of the eye.

FIG. 9 illustrates how rotation of the eye 8 changes the optical path when using plane wave illumination, which thereby gives rise to a measurable signal. A laser beam 6a having an illumination angle β is incident on and reflected from a point on the cornea 7 of the eye 8 when the eye 8 is in a first position (eye rotation α=0°). Based on the input angle β, there is one point on the cornea 7 that, due to the local curvature, will reflect light at the same angle as the incident angle and back to the receiving unit (not shown). This point remains the same relative to the centre of the cornea 7 when the eye 8 rotates. The eye 8 is rotated into a second position (α=20°), in which the laser beam 6b is incident on and reflected from a point on the cornea 7 and back to the receiving unit. The change in distance of the optical path (the optical path difference, OPD) of the reflected laser beams 6a and 6b between the cornea 7 and the receiver unit depends on the angle of rotation α and can therefore be measured to determine the eye rotation.

Figure 10:
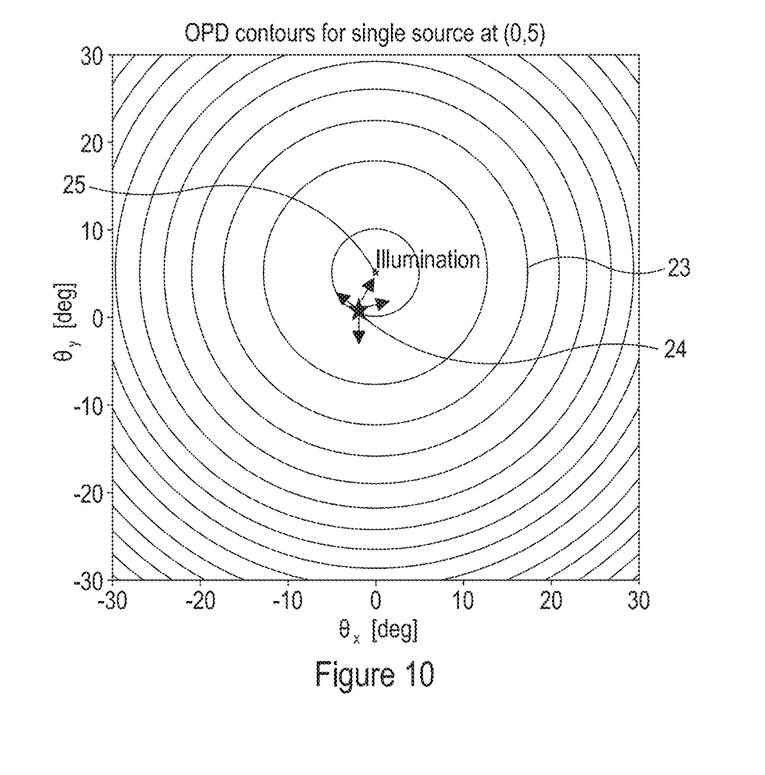
FIG. 10 depicts the contour lines of OPD for one laser source.

FIG. 10 shows how the OPD changes with the angle of rotation. In particular, contour lines 23 OPD are shown, for which the OPD is constant. A star indicates an arbitrary position 24 in rotation space of the eye, and arrows indicate possible directions of rotation of the eye. The central point 25 indicates the position of the laser illumination on the cornea. The most accurate measurements (corresponding to the largest OPD) are possible for rotation in a direction perpendicular to the contour lines 23. Conversely, rotation following the tangent of the contour lines 23 does not change the OPD and therefore has the worst accuracy.

Figure 11:
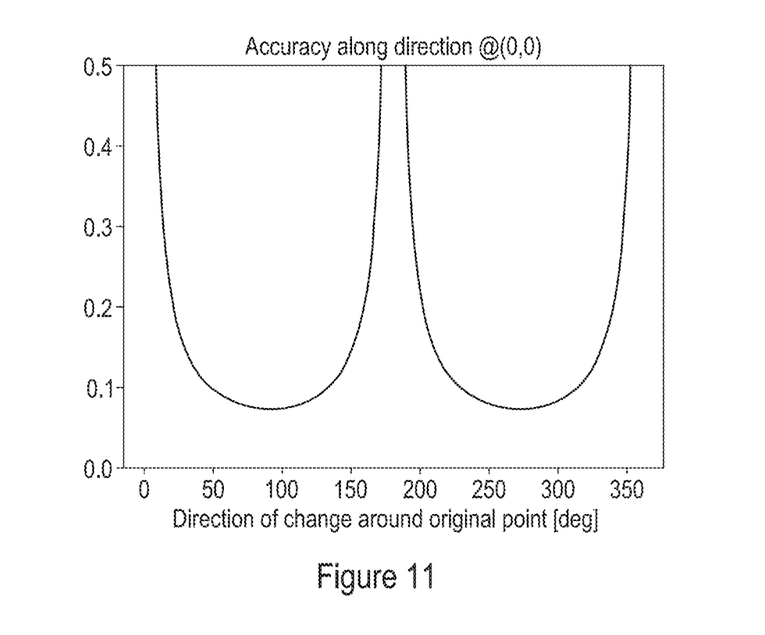
FIG. 11 depicts a graph plotting the accuracy of measurements of rotation against the direction of rotation for one laser source.

The accuracy as a function of the angle of rotation from any given position is illustrated in FIG. 11. The accuracy can be defined as the smallest determinable change in angle, so that a large number indicates a poor accuracy (low resolution) and a small number indicates a good accuracy (high resolution). As can be seen from FIG. 11, rotation in a tangential direction along the OPD line 23 (i.e. θ=0° or θ=180°) has the worst accuracy, whilst rotation in a perpendicular direction (i.e. θ=90° or θ=270°) has the best accuracy. The accuracy as a function of the angle of rotation can be expressed by the following equation:

$$\text{accuracy } [deg] = \frac{\lambda}{2} |\nabla_V OPD(\theta)|^{-1}$$

Figure 12:
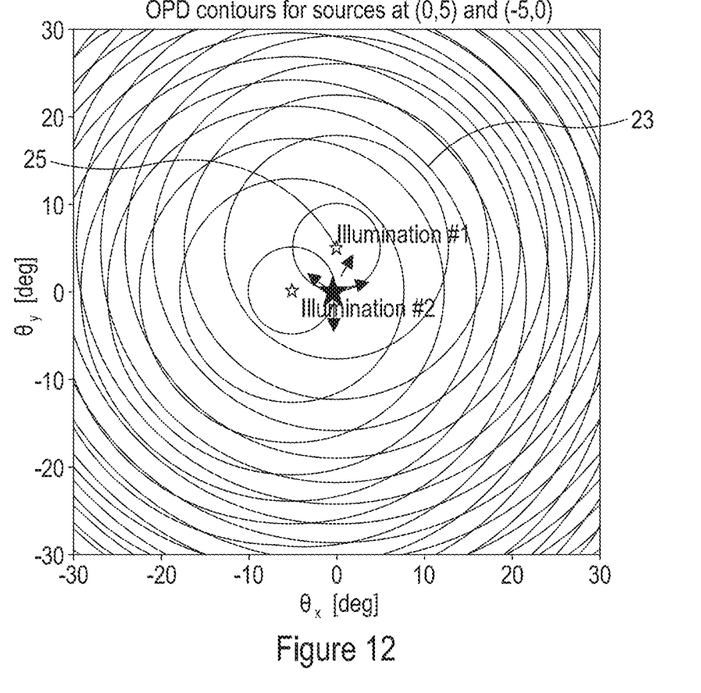
FIG. 12 depicts the contour lines of OPD for two laser sources.
Figure 13:
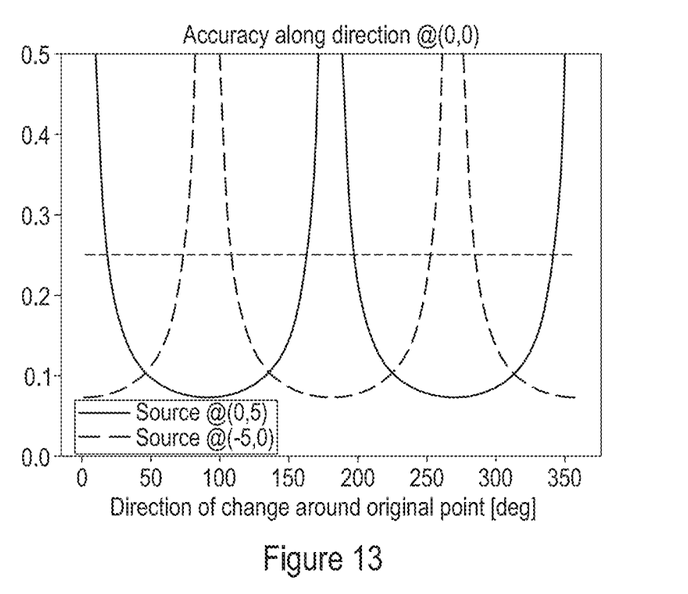
FIG. 13 depicts a graph plotting the accuracy of measurements of rotation against the direction of rotation for two laser sources.

To solve this problem, further laser beams can be provided. FIGS. 12 and 13 show the OPD contour lines 23 and corresponding accuracy plot for two laser sources providing two spatially separated laser beams for illuminating the cornea. As can be seen from the graph in FIG. 13, by using two sources as shown, the accuracy of at least one source will always be less than 0.25 degrees (indicated by the dashed line).

Figure 14:
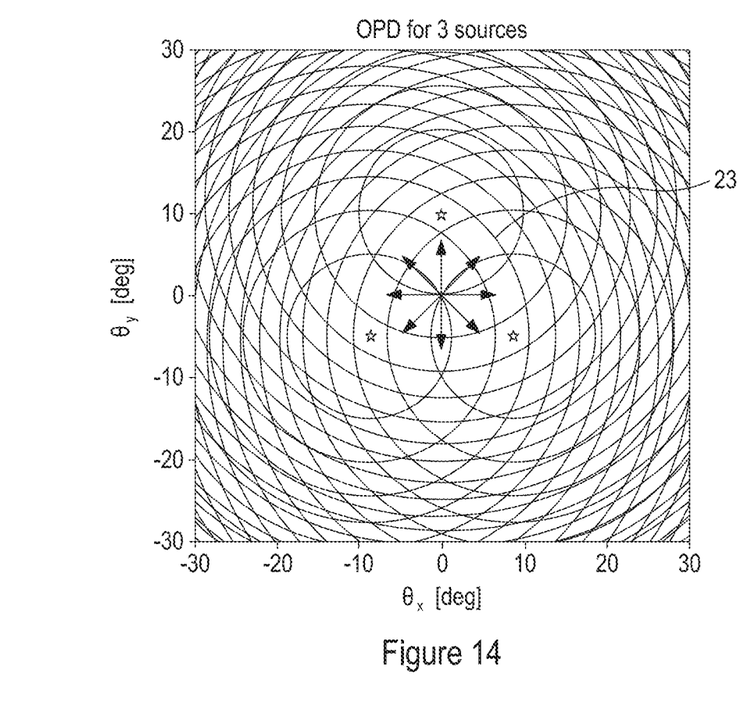
FIG. 14 depicts the contour lines of OPD for three laser sources.
Figure 15:
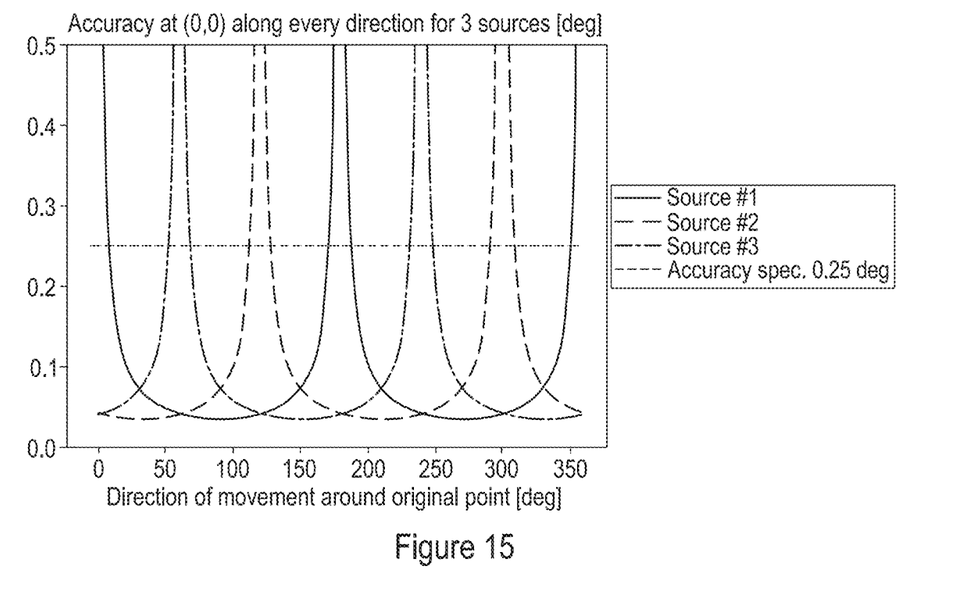
FIG. 15 depicts a graph plotting the accuracy of measurements of rotation against the direction of rotation for three laser sources.

FIGS. 14 and 15 shows the OPD contour lines 23 and corresponding accuracy for a configuration comprising three laser sources. Each laser beam is separated by an angle of 17°, which provides an accuracy of less than approximately 0.05 degrees in all directions from any position on the cornea.

Figure 16:
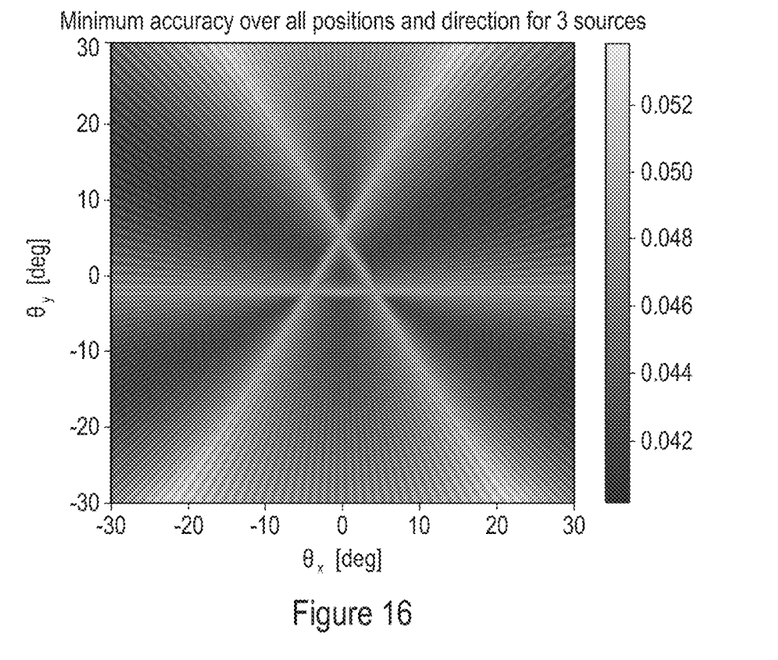
FIG. 16 depicts graph of the minimum accuracy for rotation in any direction using a three laser source configuration with 17° angular distance between laser beams and for any rotation position of the eye from −30° to 30° about the x and y axes.

FIG. 16 plots the minimum accuracy for rotation in any direction using the three laser source configuration with 17° angle between laser beams for any rotation position of the eye from −30° to 30° about the x and y axes. As can be seen from the plot, only relatively small regions have a minimum accuracy worse than 0.05 degrees for movement/rotation in any direction.

Figure 17:
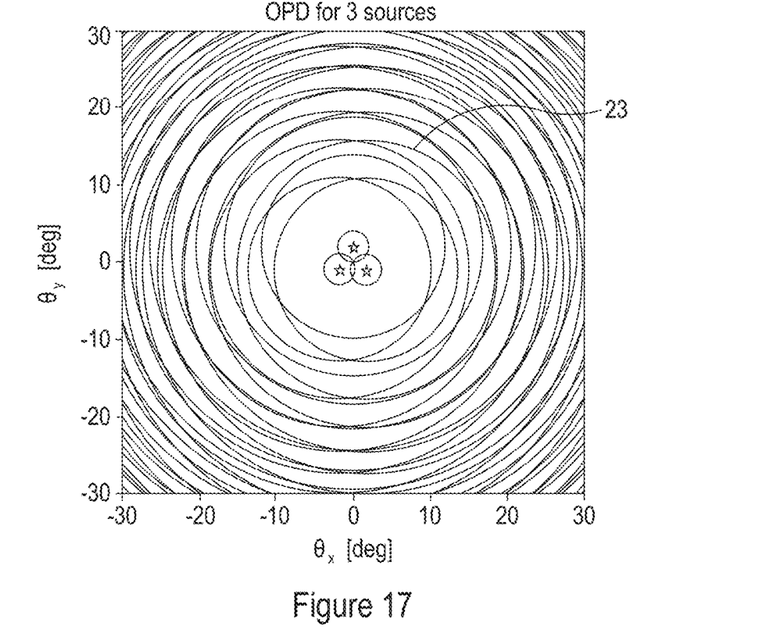
FIG. 17 depicts the contour lines of OPD for three laser sources separated by an angular distance of 3.5°.
Figure 18:
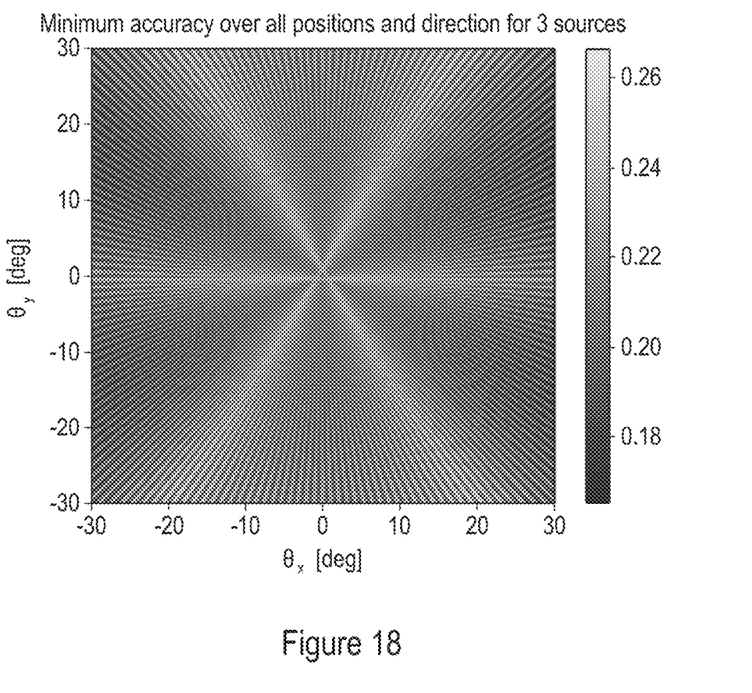
FIG. 18 depicts graph of the minimum accuracy for rotation in any direction using a three laser source configuration with 3.5° angular distance between laser beams and for any rotation position of the eye from −30° to 30° about the x and y axes.

FIG. 17 shows the OPD contour lines 23 for a device providing three laser beams separated by an angular distance of 3.5°. FIG. 18 shows a corresponding plot of the minimum accuracy for rotation in any direction from any rotational position of the eye within −30° to 30° about the x and y axes. As can be seen from the plot, the accuracy is not as good as for the 17° configuration of three sources. The minimum accuracy is approximately 0.25 degrees (compared to 0.05 degrees for the 17° configuration). Hence, reducing the angle between the laser sources worsens the accuracy.

Although specific embodiment have been described above, the claims are not limited to those embodiments. Each feature disclosed may be incorporated in any of the described embodiments, alone or in an appropriate combination with other features disclosed herein.

| Reference Numerals | |
|---|---|
| 1 | Eye tracking device |
| 2 | Frame |
| 3 | Stem |
| 4 | Laser output unit |
| 5 | Optical element |
| 6 | Laser beam |
| 7 | Cornea |
| 8 | Eye |
| 9 | Processing unit |
| 10 | Second optical element |
| 11 | Holographic elliptical element |
| 12 | Plane wave illumination field |
| 13 | Target |
| 14 | Reflected laser beam |
| 15 | Plane wave illumination |
| 16 | Weakly focused illumination |
| 17 | Strongly focused illumination |
| 18 | Position along the x-axis |
| 19 | Position along the y-axis |
| 20 | Diverging laser beam |
| 21 | VCSEL laser source |
| 22 | Holographic optical element (HOE) |
| 23 | Contour line |

-continued

| Reference Numerals | |
|---|---|
| 24 | Eye position |
| 25 | Central point |

The invention claimed is:

1. An eye tracking device for integrating in a frame for mounting to a user's head, the device comprising:
   a laser output unit for fixing to the frame and configured to provide at least three spatially separated laser beams for illuminating a cornea of the user's eye when in use;
   a receiver unit for fixing to the frame and configured to receive reflections of the at least three spatially separated laser beams and to provide a tracking signal usable for determining a distance or velocity of the cornea; and
   a processing unit, configured to determine a direction of rotation of the user's eye from the tracking signal based on a change of a length of an optical path between the cornea and the receiver unit of at least one of the at least three spatially separated laser beams,
   wherein the at least three spatially separated laser beams are separated by an angular distance in the range of 15° to 20° on the cornea of the user's eye when in use.

2. The eye tracking device according to claim 1, wherein the laser output unit comprises a laser source for emitting the laser beam.

3. The eye tracking device according to claim 1, wherein the laser output unit comprises an optic waveguide connected to a laser source for emitting the laser beam.

4. The eye tracking device according to claim 2, wherein the laser output unit is also the receiver unit and the tracking signal is provided by self-mixing interference in the laser source.

5. The eye tracking device according to claim 2, wherein the tracking signal is determined from an optical output of the laser source.

6. The eye tracking device according to claim 2, wherein the tracking signal is determined from a current or voltage input to the laser source.

7. The eye tracking device according to claim 2, wherein the laser source is a vertical cavity surface emitting laser (VCSEL).

8. The eye tracking device according to claim 1, further comprising one or more optical elements fixed to the frame and configured to modulate the laser beams for illuminating the cornea.

9. The eye tracking device according to claim 1, wherein the one or more optical elements are collimating lenses for providing plane wave illumination of the cornea.

10. The eye tracking device according to claim 8, wherein the one or more optical elements are focusing lenses for focusing the laser beams on the cornea.

11. The eye tracking device according to claim 8, wherein the one or more optical elements are reflective lenses.

12. The eye tracking device according to claim 11, wherein the laser output unit is configured to be fixed to a stem of the frame running a long a side of the user's head when in use.

13. A virtual reality (VR) or augmented reality (AR) headset comprising a frame for mounting to a user's head and an eye tracking device according to claim 1 integrated in the frame.

14. The eye tracking device according to claim 1, wherein the processing unit is configured to determine the direction of rotation of the user's eye from the tracking signal based on a change of a length of an optical path between the cornea and the receiver unit of at least two of the at least three spatially separated laser beams.

15. A method of eye tracking comprising:
   mounting a frame to a user's head;
   illuminating a cornea of the user's eye with at least three spatially separated laser beams provided by a laser output unit fixed to the frame;
   receiving a reflection of the at least three spatially separated laser beams with a receiver unit fixed to the frame and providing a tracking signal usable for determining a distance or velocity of the cornea; and
   determining with a processing unit a direction of rotation of the user's eye from the tracking signal based on a change of a length of an optical path between the cornea and the receiver unit of at least one of the at least three spatially separated laser beams,
   wherein the at least three spatially separated laser beams are separated by an angular distance in the range of 15° to 20° on the cornea of the user's eye when in use.

16. The method of claim 15, further comprising determining with the processing unit the direction of rotation of the user's eye from the tracking signal based on a change of a length of an optical path between the cornea and the receiver unit of at least two of the at least three spatially separated laser beams.

* * * * *